United States Patent [19]

Rooney

[11] Patent Number: 5,958,254
[45] Date of Patent: *Sep. 28, 1999

[54] OXYGEN SCAVENGERS INDEPENDENT OF TRANSITION METAL CATALYSTS

[75] Inventor: Michael Laurence Rooney, Lan Cove, Australia

[73] Assignee: Commonwealth Scientific and Industrial Research Organization, Campbell, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/446,702

[22] PCT Filed: Nov. 24, 1993

[86] PCT No.: PCT/AU93/00598

§ 371 Date: Jul. 13, 1995

§ 102(e) Date: Jul. 13, 1995

[87] PCT Pub. No.: WO94/12590

PCT Pub. Date: Jun. 9, 1994

[30] Foreign Application Priority Data

Nov. 24, 1992 [AU] Australia .................. PL6005

[51] Int. Cl.$^6$ .............. C02F 1/70; C09K 15/00; C01B 3/02; B01D 19/04

[52] U.S. Cl. .................. 210/757; 210/750; 252/188.28; 252/188.1; 252/188.23; 252/188.25; 252/397; 426/107; 428/411.1

[58] Field of Search .................. 252/188.28, 188.21, 252/188.22, 188.23, 314, 389.2, 397, 400.2, 405, 188.25; 428/411.1, 516, 35.4, 35.5, 35.2; 502/401, 402; 210/750, 757; 206/484.1, 484.2; 426/107, 110

[56] References Cited

U.S. PATENT DOCUMENTS 3,615,454 10/1971 Cescon et al. ............ 430/292
3,768,976 10/1973 Hu et al. ............ 422/58
3,941,759 3/1976 Taylor et al. ............ 523/126
4,282,111 8/1981 Ciuba ............ 252/178
4,356,301 10/1982 Gleim ............ 528/487
4,555,473 11/1985 Dueber et al. ............ 430/281

(List continued on next page.)

FOREIGN PATENT DOCUMENTS

| 28228/92 | 6/1993 | Australia . |
| 0 301 719 | 2/1989 | European Pat. Off. . |
| 0 366 040 | 5/1990 | European Pat. Off. . |
| 0394822 | 10/1990 | European Pat. Off. . |
| 0 406 169 A1 | 1/1996 | European Pat. Off. . |
| 58-209989 | 11/1983 | Japan . |
| 60-120688 | 6/1985 | Japan . |
| 60-52287 | 7/1985 | Japan . |
| 3-088592 | 4/1991 | Japan . |
| 870638 | 6/1961 | United Kingdom . |
| WO 96/07711 | 3/1996 | WIPO . |

OTHER PUBLICATIONS

Rooney, M. L., "Measuring Packaging Film Attributes" Food Australia 41(8), Aug. 1989, pp. 880–881.
Holland et al., "New methods of measuring permeabilities of packaging films", CSIRO Fd. Res. Q. 1981, 41 pp. 47–50.
Rooney, M. L., "Photosensitive oxygen scavenger films: an alternative to vacuum packaging" CSIRO Fd. Res. Q 1983, 43 pp. 9–11.

(List continued on next page.)

Primary Examiner—Joseph D. Anthony
Attorney, Agent, or Firm—McDermott, Will & Emery

[57] ABSTRACT

A composition for reducing the concentration of molecular oxygen present in an atmosphere or liquid, comprising at least one reducible organic compound which is reduced under predetermined conditions. The reduced form of the compound being oxidizable by molecular oxygen, wherein the reduction and/or subsequent oxidation of the organic compound occurs independent of the presence of a transition metal catalyst.

8 Claims, 3 Drawing Sheets

U.S. PATENT DOCUMENTS

| | | | |
|---|---|---|---|
| 4,847,001 | 7/1989 | Cuisia et al. | 252/188.28 |
| 4,942,112 | 7/1990 | Monroe et al. | 430/282.1 |
| 5,043,166 | 8/1991 | Barenholz et al. | 424/450 |
| 5,098,945 | 3/1992 | Pitteloud et al. | 524/349 |
| 5,147,604 | 9/1992 | Ciuba et al. | 422/13 |
| 5,211,875 | 5/1993 | Speer et al. | 315/14 |
| 5,354,486 | 10/1994 | Evans | 508/501 |

OTHER PUBLICATIONS

Rooney, M. L., "New methods of maintaining product quality through packaging interaction" PA 1990—Session B–2.

Kirk–Othmer (1978) "Anthraquinone" Encyclopaedia of Chemical Technology (3rd Ed.) vol. 2, pp. 700–757.

Kirk–Othmer (1978) "Dyes, sensitizing" Encyclopaedia of Chemical Technology (3rd Ed.) vol. 8, pp. 393–408.

Rooney, M. L. (1995) "Active Food Packaging" pp. 1–33.

Rooney, M. L. (1995) "Active Food Packaging" pp. 74–110.

"Singlet Oxygen: An Intermediate in the Inhibition of Oxygen Permeation Through Polymer Films", by Michael L. Rooney et al, Chemistry and Industry, Dec. 15, 1979, pp. 900–901.

"Oxygen Scavenging from Air in Packaging Headspaces by Singlet Oxygen Reactions in Polymer Media", by Michael L. Rooney, Journal of Food Science, vol. 47, No. 1, Jan.–Feb. 1982, pp. 291–294, 298.

"Oxygen Scavenging: A Novel Use of Rubber Photo–Oxidation", by Michael L. Rooney, Chemistry and Industry, Mar. 20, 1982, pp. 197–198.

Patent Abstracts of Japan, C–138, p. 153, JP,A,57–145107, Sep. 8, 1982.

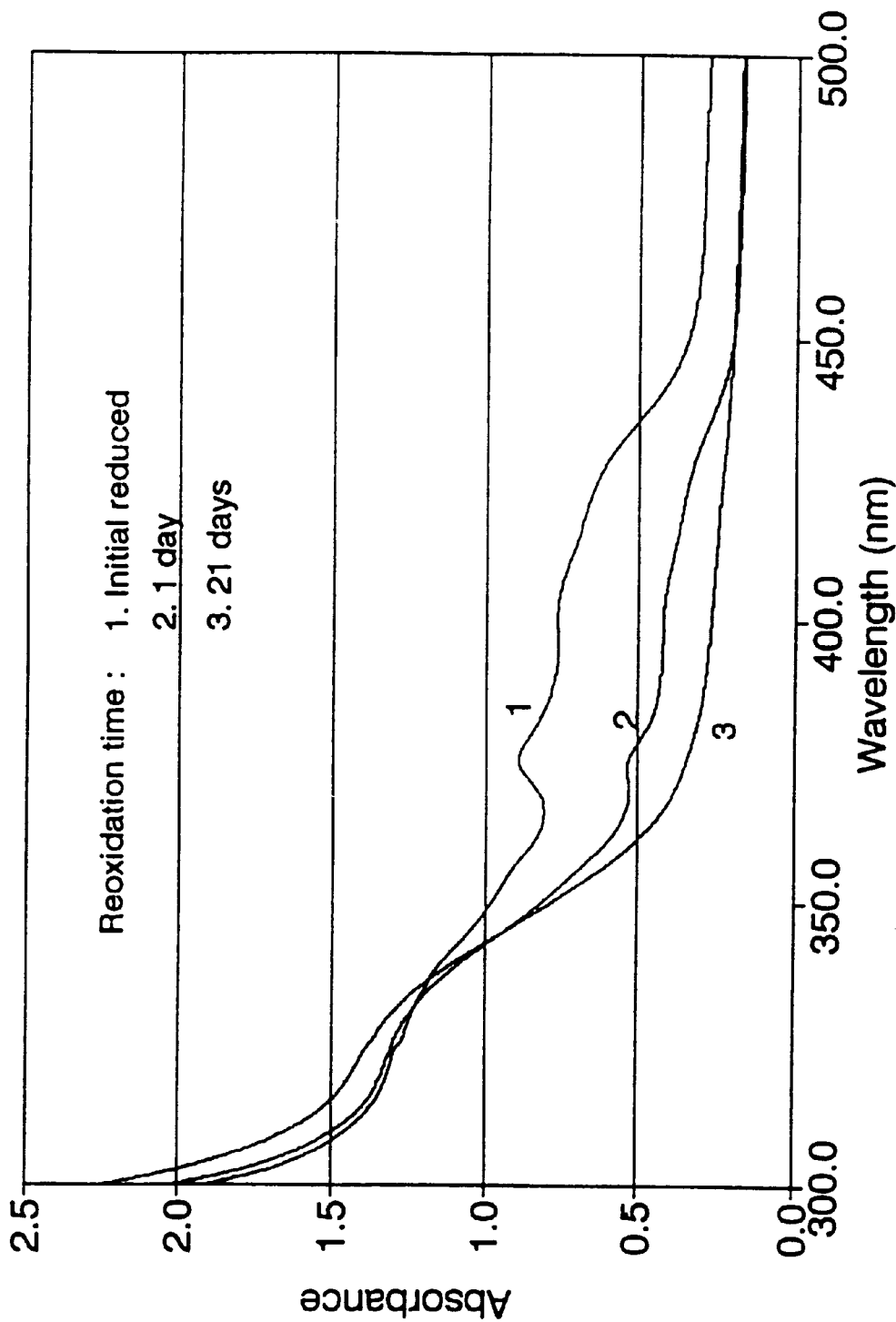

OXYGEN SCAVENGERS INDEPENDENT OF TRANSITION METAL CATALYSTS

This application is a 371 of PCT/AU93/00598 filed Nov. 24, 1993.

FIELD OF THE INVENTION

This invention relates to compositions for reducing the oxygen concentration present in an atmosphere or liquid (often referred to as oxygen scavenging). In one particular application, the compositions are used in or in association with food packaging.

BACKGROUND OF THE INVENTION

A wide variety of foods and other materials are susceptible to loss in quality during storage under atmospheric levels of oxygen. The damage can arise from chemical oxidation of the product, from microbial growth, and from attack by vermin—much of which may be avoided by reducing the oxygen availability in the environment of the materials. In the field of packaging, relatively low-oxygen atmospheres have traditionally been generated by vacuum packing and inert gas flushing. Such methods are not, however, generally applicable for various reasons. For example:

- soft porous foods such as cakes cannot be subjected to strong vacuum;
- fast filling speeds generally preclude substantial evacuation of or thorough inert gas flushing of food packages;
- filling some gas-flushed containers, such as beer bottles often results in occlusion of air;
- evacuation or flushing offers no residual capacity for removal of oxygen, which may have desorbed from the food or entered the package by leakage or permeation.

As a consequence there has been much interest in chemical techniques for generating low-oxygen atmospheres and deoxygenating liquid or semi-liquid foods. Thus, there are approaches based on the use of oxidisable solids, for example porous sachets containing iron powder. In another technique, oxidisable MXD-6 Nylon is blended with polyester in the walls of blow-moulded containers—the effectiveness of this depends on the presence of a cobalt salt catalyst, moreover the speed of oxygen removal is limited by the oxygen permeability of the polyester. Further methods include sandwiching crystalline oxidisable material between the layers of multilayer containers, and including a catalyst for the reaction of oxygen with hydrogen in a sandwich arrangement as above or as a deposit on the inner surface of the package.

Heterogeneous systems such as described above do not, however, adequately meet the general needs of the packaging industry, largely because they are often oxygen-sensitive prior to use or can be activated only under restricted conditions of, for example, temperature or humidity. One method which might be used to provide oxygen scavenging in packages as required, is disclosed in Rooney, M. L., Chemistry and Industry, Mar. 20, 1982, pp. 197–198. This method involves the inclusion of a photooxidizable rubber and a photosensitising dye into a polymer film packaging material and then exposing it to visible light. Similar methods are disclosed in Rooney, M. L. and Holland, R. V., Chemistry and Industry, Dec. 1979, pp. 900–901 and Rooney, M. L., Journal of Food Science, Vol. 47, No. 1, pp. 291–2294, 298. However, whilst these methods initiate oxygen scavenging upon illumination, they require constant illumination of the package in order to maintain the scavenging effect. U.S. Pat. No. 5,211,875 proposes an alternative method intended to avoid the problem of oxygen-sensitivity prior to use, involving an oxidizable organic compound (typically 1, 2-polybutadiene)and a transition metal catalyst (typically cobalt salt). Oxygen scavenging is initiated by exposing the composition to an electron beam, or ultraviolet or visible light.

SUMMARY OF THE INVENTION

However, the inclusion of a transition metal catalyst has a number of disadvantages including added cost, solubility difficulties, and a "gritty" appearance and reduced transparency of films made from such compositions. Some transition metal catalysts are also considered toxic and may not, therefore, be used with food.

The present invention avoids the disadvantages of including a transition metal catalyst. It may be based on plastic or other polymer-based compositions which can be activated as required, to effect reduction of ambient oxygen levels. The oxygen scavenging effect of the present invention also does not depend upon constant illumination with visible light.

Accordingly, in a first aspect the present invention provides a solid phase composition for reducing the concentration of ground state molecular oxygen present in an atmosphere or liquid, comprising at least one reducible organic compound which is reduced when the composition is subjected to predetermined conditions, the reduced form of the compound being oxidizable by ground state molecular oxygen, wherein the reduction and/or subsequent oxidation of the organic compound occurs independent of both constant illumination with visible light and the presence of a transition metal catalyst.

DETAILED DESCRIPTION OF THE INVENTION

Preferably, the reduction and/or subsequent oxidation of the at least one reducible organic component is also independent of the presence of an alkali or acid catalyst.

The reducible organic compound for use in this invention may be reduced under predetermined conditions such as by exposure to light of a certain intensity or wavelength or, alternatively, by the application of heat, γ-irradiation, corona discharge or an electron beam. Possibly, also, the compound may be reduced by incorporating in the composition a reducing agent which in turn can be activated under predetermined conditions, say by heating.

Typically the reducible organic compound will be a compound having the capacity to be converted to an excited state such as a triplet form, which then becomes reduced to an essentially stable state by gaining or abstracting an electron or hydrogen atom from other molecules or by redistributing an electron or hydrogen atom within the compound itself. The reduced molecule is reactive towards molecular oxygen to produce activated species such as hydrogen peroxide, hydroperoxy radical or a superoxide ion. Preferably, the reducible organic compound is stable in air at room temperature or is in its fully oxidized state. Examples of suitable compounds include quinones, such as benzoquinone, anthraquinone (preferably, 9,10-anthraquinone) and naphthoquinone (preferably, 1,4-napthoquinone); and photoreducible dyes and carbonyl compounds which have absorbance in the UV spectrum, such as azo, thiazine, indigoid and triarylmethane compounds.

Most preferably, the reducible organic compound is a substituted anthraquinone such as 2-methylanthraquinone and 2-ethylanthraquinone. In some applications, 2-ethylanthraquinone shall be preferred to 2-methylanthraquinone due to its greater solubility.

The reducible organic compound component may comprise 0.1–99.9 wt % of the composition. More preferably, the reducible organic compound comprises 0.1–50 wt % of the composition.

Compositions of this invention which involve the formation of an activated oxygen species (eg, peroxide) may further comprise a scavenging component reactive towards the activated species. This may be embodied in the reducible organic compound itself, for example a quinone having an amine group would be effective, but in any event it should be an agent which is substantially stable in contact with air at room temperature. Suitable examples of the activated oxygen scavenging component include antioxidants such as alkylated phenols and bisphenols, alkylidene bis-, tris- and polyphenols, thio- and bis-, tris- and polyalkylated phenols, phenol condensation products, amines, sulfur-containing esters, organic phosphines, organic phosphites, organic phosphates, hydroquinone and substituted hydroquinones; inorganic compounds such as sulphates, sulfites, phosphites and nitrites of metals, particularly those of groups 1 and 2 of the periodic table and first row transition metals, zinc and tin; sulfur-containing compounds such as thiodipropionic acid and its esters and salts, thio-bis(ethylene glycol β-aminocrotonate), as well as the amino acids cysteine, cystine and methionine; and nitrogen-containing compounds capable of reacting with activated forms of oxygen include primary, secondary and tertiary amines and their derivatives including polymers.

Preferably, the scavenging component reactive towards the activated oxygen species is selected from the group consisting of triphenylphosphine, triethylphosphite, triisoproppylphosphite, triphenylphosphite, tris (nonylphenyl) phosphite, tris(mixed mono- and bis-nonylphenyl) phosphite, butylated hydroxytoluene, butylated hydroxyanisole, tris(2,4-di-tert-butylphenyl) phosphite, dilaurylthiodiprpionate, 2,2-methylene-bis-(6-t-butyl-p-cresol), tetrakis(2,4-d-tert-butylphenyl)4,4'-biphenylene diphosphonite, poly(4-vinylpyridine) and mixtures thereof.

The activated oxygen species-scavenging component may be in the form of a polymer or oligomer. Such forms may be prepared by, for example, covalently bonding a compound such as those activated oxygen species-scavenging compounds listed above to a monomer or co-monomer. A limitation on the molecular size of the activated oxygen species-scavenging component will be the effect, if any, it has on functional properties of any other polymer with which it is combined as in blending for instance.

The activated oxygen species-scavenging component may comprise 0.1 to 99.9 wt %, more preferably, 0.1 to 50 wt % of the composition.

As an alternative to components which can be excited to a state which converts oxygen to an activated species, compositions according to this invention may comprise components which are excitable to a state in which they react and bind directly with oxygen diffusing into the composition from the surroundings.

The compositions according to the invention may further comprise an adhesive (eg, a polyurethane such as LAMAL) and/or a polymer. Preferred polymers are homogenous and include polyvinyls, polyolefins and polyesters or their copolymers, ethyl cellulose and cellulose acetate. Heterogeneous substrates, eg inorganic polymers such as silica gel or polymer mixtures may also be used.

Alternatively or additionally, the reducible organic compound itself maybe in a polymerised form either as homopolymers or copolymers. Oligomer forms may also be suitable. Reducible monomers can be made by covalently bonding an ethylenically unsaturated group to a reducible organic compound. The reducible organic compound may also carry groups capable of reaction with other polymerisable molecules and preformed polymers. Particular examples of ethylenically unsaturated reducible monomers include vinyl and isopropenyl derivatives, preferably bonded to the reducible organic compound in such a manner as not to decrease the lifetime of the triplet excited state compared with that of the unsubstituted reducible organic compound. Thus in the case of 9,10-anthraquinone substitution occurs preferably at the 2, 3, 6 or 7 positions. If such a reducible organic compound carries additionally further substituents besides the vinyl or isopropenyl group, such substituent should preferably be in one or more of the remaining preferred positions.

Co-monomers can be any ethylenically unsaturated substance whether mono-unsaturated, di-unsaturated or poly-unsaturated. Examples include alkenes of carbon number two to eight, vinyl acetate, vinyl alcohol, acrylic monomers including methacrylic and acrylic acids, their amides, esters and metal salts as in ionomers, acrylonitrile, methacrylonitrile, norbornene, norbornadiene. If the reducible organic compound is a substituted 9,10-anthraquinone and is required to be difunctional monomer for formation of a polyester, the two carboxyl or hydroxyl substituents, or their derivatives should preferably be in any two of the positions, 2, 3, 6 or 7.

Reducible monomers may be polymerised as condensation polymers such as polyesters, including polycarbonates, polyamides, polyimides. An example of a polyamide is the polymer of 2,6-anthra-9,10-quinone dicarboxylic acid with 1,6-diaminohexane. Reducible monomers may also be polymerised with diisocyanates or diols to form polyurethanes or may be bonded to polyurethanes. An example of the latter is the reaction product of 2-bromomethyl-9,10-anthraquinone with the polyurethane from toluenediisocyanate and 1,6-hexandiol.

Preferably, the composition according to the invention comprises a reducible organic compound and an activated oxygen species-scavenging form, both of which are present in polymerised form(s).

Where the reducible organic compound is dispersed or dissolved in a polymer which does not readily donate a hydrogen atom or electron to the reducible organic compound in its excited state, an additional source of labile hydrogen or electron is preferred. Such a compound is preferably one containing a hydrogen bonded to nitrogen, sulfur, phosphorus or oxygen especially where a hydrogen is bonded to a carbon atom bonded to the abovementioned heteroatom. Alternative sources of electrons are salts of organic compounds such as the salts of sulfonic acids or carboxylic acids. In one form of the invention the sodium sulfonate salt of a polymerised 9,10-anthraquinone would be used. Thus the reducible organic compund itself can be the source of its own electron for the reduction process.

The reduced form of the organic compound used in the composition, brings about a reduction in the molecular oxygen concentration in the atmosphere or liquid through its oxidation by the molecular oxygen, the reduction and/or oxidation being independent of the presence of a transition metal catalyst and, preferably, also independent of the presence of an alkali or acid catalyst. Nevertheless, transition metal compounds, alkaline and/or acidic agents may also be included in the compositions where they may effect the rate of oxygen scavenging or may enhance the reduction and/or subsequent oxidation of the organic compound. For example, ascorbic acid may be included in the compositions comprising anthraquinones as a photoreduction enhancer.

Reduction of the reducible organic compound may take place only when convenient. This might be, for example, when the composition is being made into or brought into association with packaging material or, alternatively and perhaps more usually, after formation of a package and prior to filling and sealing. Reduction may even be deferred until after sealing of the package.

Thus, in a second aspect, the invention provides a method for reducing the concentration of molecular oxygen present in an atmosphere or liquid, comprising exposing the atmosphere or liquid to a composition according to the first aspect and thereafter, reducing the reducible organic compound.

Alternatively, the invention provides a method for reducing the concentration of molecular oxygen present in an atmosphere or liquid, comprising exposing the atmosphere or liquid to a pre-reduced form of a composition according to the first aspect.

The compositions according to the invention may be used independently or as components of blends. They may take the form of a cross-linked polymeric matrix, as in a can lacquer, or be bonded to or absorbed onto an inorganic polymer, such as silica. They may be effectively applied as, or incorporated in, for example, bottle closure liners, PET bottles, liners for wine casks, inks, coatings, adhesives, films or sheets either alone or as laminations or co-extrusions, or they may take the form of pads, spots, patches, sachets, cards, powders or granules which may be attached to packaging material or located independently within a package.

Films comprising the composition according to the invention may be monolayer or multilayer laminate, and may be used on their own or may be affixed or applied to a solid substrate (eg, a solid packaging material). Where the film is a multilayer film, it is preferable that an outer layer is an oxygen barrier film, so that the film may be used in a manner such that only the layer(s) containing the reducible organic compound is exposed to molecular oxygen from the atmosphere or liquid for which a reduction in molecular oxygen concentration is required.

Films comprising the composition may also be used is as a chemical barrier to oxygen transmission through a packaging material. Thus if a packaging material has a certain oxygen permeability, the oxygen passing through it from the outside environment into a reduced oxygen content atmosphere within the package can be scavenged by the reducible organic compound. The composition can be dissolved or dispersed within the packaging material or can be placed adjacent to it as an additional layer on the inner side of the package.

In multilayer laminate films, an activated oxygen species-scavenging component may be provided in a seperate layer from the layer comprising the activatable component.

Film layers containing a reducible organic compound may be formed either from molten plastic compositions extruded to give a particular shape or dimensions or from a liquid state which gives the final solid layer by reaction, or evaporation of a volatile liquid. Plastic compositions will often be extruded at temperatures between 50° C. and 350° C. depending upon chemical composition and molecular weight distribution. Extrusion may be via a die to give a film layer either alone or as a component layer of a multilayer coextrusion. The layer comprising the reducible organic compound may be extruded onto another substrate as in extrusion coating and lamination. Extrusion may be followed by moulding as in injection or blow moulding. These processes can involve the formation of foams in some instances.

The composition according to the invention may also take the form of a printing ink, coating or lacquer. These may or may not be pigmented. The printing inks, coatings and lacquers will normally be applied in a liquid state and solidified by evaporation of the solvent or dispersion medium or by reaction of some of the constituents.

While the composition and methods according to the invention are likely to be of particular value in food-packaging situations where oxygen removal is desirable, their utility is not limited thereto. Other applications include, for example, the generation of low-oxygen atmospheres in vessels for anaerobic or microaerophilic microbiology, or the generation of low-oxygen gas for blanketing flammable or oxygen-sensitive materials. The technology can also be used in conjunction with technologies based on other means of oxygen scavenging such as photosensitized generation of carbon dioxide.

Compositions according to the invention may be re-reduced, if necessary, by resubjecting to the predetermined condition to recommence oxygen scavenging. This may be particularly useful if the composition has been exposed to air prior to package sealing. Re-reduction may be achieved at a light intensity as low as ambient room illumination for an hour depending upon the amount of re-reduction required.

In addition to the advantages disclosed above, the method can, in some instances, be practised with compositions formulated to be self-indicating in respect to their capacity for oxygen removal. That is, some reducible organic compounds upon reduction will undergo a change in colour or change in UV-visible, infrared or near-infrared absorption spectrum. For example, photoreduction of quinones and some of their derivatives results in a spectral shift from the UV to longer wavelengths, especially to the visible region of the spectrum; by incorporation of such compounds, package material can be formulated which will undergo a colour change as the capacity for reducing the oxygen concentration becomes exhausted.

This colour change also provides a mechanism for checking whether all of the reducible organic compound in the composition has been reduced. Where reduction is found to be incomplete, the composition may be resubjected to the predetermined conditions. Further, such compositions may also be used as an indicator of seal breakage. That is, in the area of film where a heat seal or other seal is made between the film containing the reducible organic compound and a material of sufficiently high oxygen barrier, oxygen cannot reach the reducible organic compound as fast as it can in other areas. The seal area therefore remains coloured due to the presence of reduced organic compound. The fluorescent emission from the reduced organic compound is particularly useful for this purpose. A green fluorescence is seen when 9,10-anthraquinone with substitutents in the 2-position are bonded by a methylene group to the ring. Alternatively, a strip or ring of the composition may be located on the inner side of the sealed package adjacent to the seal. Where the seal is formed by an adhesive, the composition may comprise the adhesive. If the seal should be incomplete or become broken in any way, then this may be detected by a colour change in the composition.

Visible colour changes may be detected by eye, whereas changes in UV-visible, infrared or near infrared absorption spectrum may be measured with an appropriate device such as a photocell used with a light source of appropriate wavelength and intensity.

The invention will now be further described with reference to the following non-limiting examples and figures.

BRIEF DESCRIPTION OF THE FIGURES

FIG. 3: Reoxidation of reduced species in air after storage for 106 days under nitrogen. The reoxidation involves the gradual loss of the peak at 375 nm with a corresponding increase in the peak at 327 nm. The three spectra shown above correspond to the film sample reduced, and then after 1 day and 21 days left to oxidise.

EXAMPLE 1

Photoreduction and reoxidation of anthraquinone in ethyl cellulose.

9,10-Anthraquinone, 0.05 g, and ethyl cellulose (degree of substitution, 2.5), 1.5 g, were dissolved in ethyl acetate, 12 ml. The solution was cast onto plastic coated glass to give a film 10–15$\mu$ thick when the solvent had evaporated. A sample of the film was placed in a nitrogen flushed spectrophotometric cuvette and the absorbance at 252. nm and 264. nm was measured.

While still in the cuvette under nitrogen, the sample was irradiated for 20 seconds with light from a xenon lamp using a Suntest CPS instrument, and the ratio of absorbance at 254.8 to that at 264.3 measured. The sample was exposed to air for a total of 10 days to allow reoxidation of the anthrahydroquinone and/or the semi-quinone, which would result in the absorbance ratio returning towards its initial value. The results in Table 1 show that photoreduction occurs on irradiation, followed by reoxidation upon exposure to air. Slight shifts in $A_{max}$ occurred with reduction and oxidation.

TABLE 1

| Treatment | Absorbance Ratio | | |
|---|---|---|---|
| | 254.3/264.3 | 252.4/264.3 | 252.8/264.3 |
| None | 2.10 | | |
| Irradiated (20s) | | 0.93 | |
| 3 days in air | | | 1.44 |
| 6 days in air | | | 1.49 |
| 10 days in air | | | 1.50 |

EXAMPLE 2

Photoreduction of 2-methylanthraquinone in ethyl cellulose sandwiched between two layers of polyvinylidine chloride copolymer-coated polypropylene 2-methyl-9,10-anthraquinone (hereinafter referred to 2-methylanthraquinone or MeAq), 0.0167 g, was dissolved in ethyl acetate, 9 ml, together with ethyl cellulose, 1.15 g, and a film was cast as in Example 1. The film was 20–30 $\mu$m thick. A strip of this film was placed between two layers of the PVDC-coated polypropylene, and the two outer layers were heat sealed together to form a flat package containing the ethyl cellulose layer with essentially no headspace.

Figure 1:
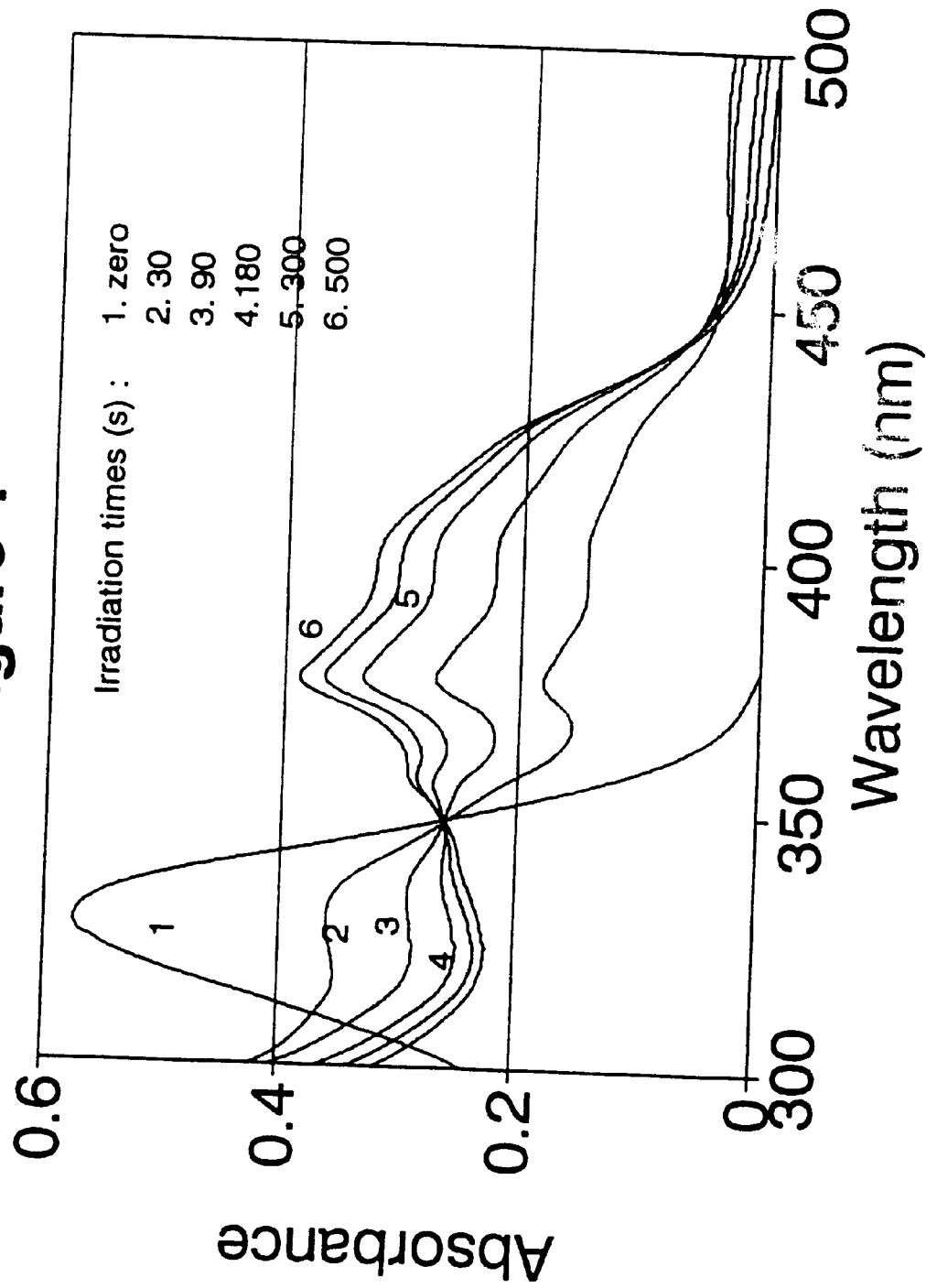
FIG. 1: Photoreduction of 2-methyl-9,10-anthraquinone (0.075M in ethyl cellulose, heat sealed between two layers of PVDC-coated polypropylene). Spectra show the photoreduction of the sample under xenon lamp irradiation (0, 30, 90, 180, 300 and 600 seconds) and detail the decline of the peak at 327 nm, with a corresponding increase in the peak at 375 nm, as irradiation time increases.

The 3-layer sample was held in a steel clamp and exposed for seven time intervals to the light from the xenon lamp as in Example 1. The maximum exposure was 10 minutes and the absorption spectrum was measured with a spectrophotometer after each exposure. The results in FIG. 1 show the decrease in absorbance due to 2-methylanthraquinone at 327 nm with increase in absorbance at 375 nm (and at longer wavelengths) due to progressive formation of the corresponding anthrahydroquinone and/or semiquinone.

These results indicate that a barrier plastic film permits the photoreduction of the 2-methylanthraquinone without the interference by atmospheric oxygen.

EXAMPLE 3

Photoreduction of 2-methylanthraquinone in ethyl cellulose sandwiched between a layer of Surlyn 1601 (Du Pont, Wilmington. USA) and a co-extruded film of Surlyn. ethylene vinyl alcohol copolymer and nylon 6

A sample of the ethyl cellulose film described above in Example 2 was placed between one high-permeability layer (Surlyn 1601) and one low-permeability layer (the co-extrusion) containing ethylene vinyl alcohol as barrier. This would allow testing whether the low barrier is sufficient to stop oxygen interference with the photoreduction.

Figure 2:
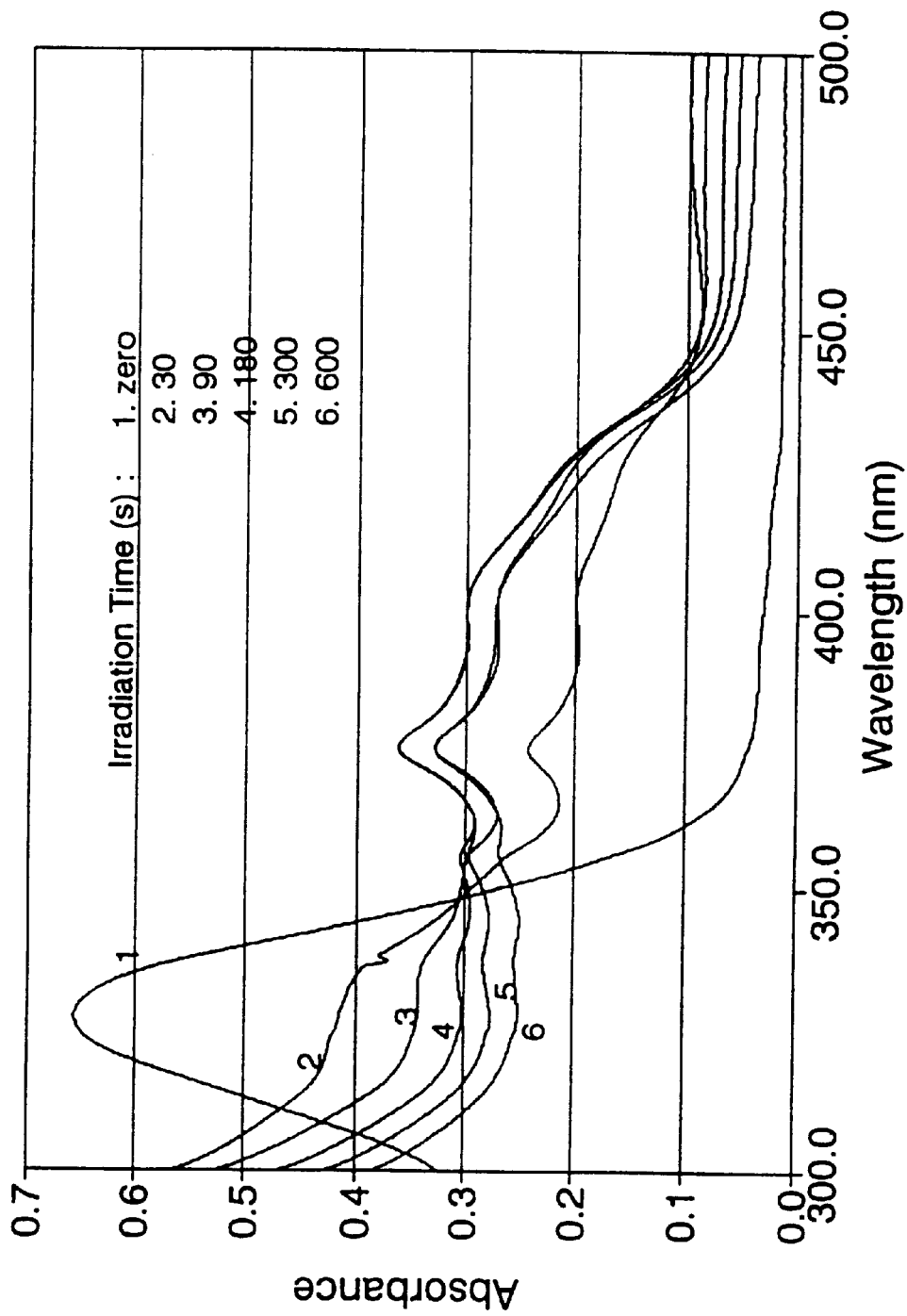
FIG. 2: Photoreduction of 2-methyl-9,10-anthraquinone (0.075M in ethyl cellulose, heat sealed between EVOH barrier laminate and SURLYN1601) under xenon lamp irradiation (0, 30, 90, 180, 300 and 600 seconds). The peak at 327 nm decreased with increasing irradiation time, while the peak at 375 nm increased until approx. 300 s irradiation, when it began to decrease.

The film sandwich was illuminated and the spectra were measured as in Example 2. The spectra in FIG. 2 show that the quinone is photoreduced but with some decrease in efficiency compared with the previous Example and with some evidence of side reaction. This result indicates that the oxygen permeability of either the layer provided by the Surlyn or the layer containing the quinone should preferably be reduced.

EXAMPLE 4

Scavenging oxygen from air in pouches made from a high-oxygen-barrier plastic

2-Methylanthraquinone, 0.05 g, was dissolved in ethyl acetate, 9 ml, together with ethyl cellulose, 1.25 g and a film cast 19 cm×18 cm on the Surlyn side of the co-extruded film described in Example 3. This sample was termed the "control" and was folded to form a pouch of dimensions 23 cm×20 cm. The pouch was flushed with nitrogen and exposed to xenon lamp irradiation as per Example 3 for 3 minutes. Some nitrogen was then removed by syringe via a septum and air, 20 ml, was added and the oxygen content measured by gas chromatography. (The quantity of 2-methylanthraquinone is approximately equimolar with 4 ml of oxygen.) The pouch was then stored in darkness.

Three additional pouches were prepared in a similar fashion but with the addition of triphenylphosphine to scavenge the hydrogen peroxide or formed derivative. The quantities of triphenylphosphine were 0.059 g, 0.118 g and 0.295 g. These pouches were treated in the same manner as the pouch from the "control".

The oxygen content of the hour pouches was determined again after storage for 25.3 hours and the initial and final results are shown in Table 2.

The film has an oxygen transmission rate of 6 cc/m$^2$/day/atmosphere at 20° C. 75% RH.

TABLE 2

Oxygen scavenging in the presence of triphenylphosphine

| Triphenylphosphine (g) | Initial oxygen (%) | Oxygen After 25.3 hrs (%) | Final oxygen (%) |
| --- | --- | --- | --- |
| 0 | 20.3 | 16.1 | 14.05 |
| 0.059 | 10.45 | 3.9 | 2.8 |
| 0.118 | 15 | 1.17 | 0.35 |
| 0.295 | 14.6 | 0.07 | 0.16 |

Preparation of the films was repeated with an additional one containing triphenylphosphine at a level of 0.59 g, as well as the 2-methylanthraquinone, but this time the pouches were opened after irradiation and the ethyl cellulose layers removed, placed in Quickfit test tubes and stoppered. The test tubes were stored in darkness for 24 hours.

Potassium iodide, 1% w/w in water was prepared and 4 ml of this solution was added to each of the test tubes. Freshly prepared starch mucilage, 2 ml, was also added and the test tubes were shaken vigorously for 30 seconds. The test tubes were allowed to stand in darkness. After 5 minutes the test tube containing the "control" film contained black stained film due to the release of iodine formed through action of the hydrogen peroxide or its derivative. The film containing triphenylphosphine, 0.059 g, showed a slight blue stain only after 3 days. The remaining films showed no evidence of iodine formation indicating no release of hydrogen peroxide from the films.

EXAMPLE 5

Oxygen scavenging using a polymerised reducible organic compound

2-Vinylanthraquinone, 0.25 g, was dissolved in benzene, 30 ml, and benzoyl peroxide, 0.01 g, was added. The solution was degassed by free-thaw evacuation and polymerisation was carried out at reflux temperature for three hours during which time a precipitate was formed. The solvent was removed and the polyvinylanthraquinone was mixed with triphenylphosphine, 0.059 g, and octanol-1-ol, 5 drops, in chloroform. The resulting solution was cast on the Surlyn side of the co-extrusion described in Example 3, with an area of approximately 25 cm×20 cm. A pouch was formed by heat-sealing this film to another piece of co-extrusion and the air was removed by evacuation. Nitrogen was injected into the pouch and this was irradiated as in Example 4. Most of the nitrogen was removed and replaced with air, 20 ml, as in Example 4.

The oxygen content of the pouch was found to be 17.4%. The pouch was held in darkness and the oxygen content was found to be 10.7% after 4 hours and 10.6% after 22.5 hours.

EXAMPLE 6

Oxygen scavenging by 2-methylanthraquinone in a UV-cured varnish

A mixture of a commercial UV-curable varnish, 50 parts, and ethanol, 50 parts, was used to dissolve 2-methylanthraquinone as a 5% solution. This mixture was applied to a polypropylene film as a 2 to 3 μm thick layer using a pilot scale coating machine. Strips of the coated polypropylene approximately 20 cm×20 cm, were cut and placed in pouches made from the film described in Example 4. After nitrogen flushing the pouches were exposed to xenon lamp irradiation for periods of time shown in Table 3. The nitrogen was removed and 200–250 ml of nitrogen containing 0.5% oxygen was injected into each pouch. The scavenging of oxygen was determined by gas chromatography and the volume of oxygen consumed after 1 hour is shown in Table 3.

TABLE 3

Oxygen scavenging by a UV-cured varnish containing 2-methylanthraquinone

| Irradiation Time (sec) | % of total oxygen scavenged after 1 hour |
| --- | --- |
| 1 | 50 |
| 2 | 28 |
| 3 | 3 |
| 4 | 31 |
| 5 | 27 |
| 6 | 19 |

Similar results were obtained when ethyl cellulose was used instead of the UV-curable varnish.

EXAMPLE 7

Oxygen scavenging in the presence of carbon dioxide

Two pouches were prepared as described in Example 4 with triphenylphosphine and 2-methylanthraquinone contents of 0.118 g and 0.055 g respectively in the ethyl cellulose layer, 1.25 g. After nitrogen flushing and irradiation as per Example 4 the pouches were evacuated and filled with 20 ml each of air and carbon dioxide. The pouches were stored in darkness and the oxygen concentration was monitored by gas chromatography.

The results are shown in Table 4 and comparison with the result for the corresponding pouch without carbon dioxide after 25.3 hours storage (Table 2) shows very little difference in scavenging rate. Current scavengers based on iron powder are often inactivated or have their scavenging rate severely retarded by the presence of carbon dioxide.

TABLE 4

| | Oxygen Concentration (%) | |
| --- | --- | --- |
| Time(h) | Pouch 1 | Pouch 2 |
| 0 | 8.3 | 7.8 |
| 5.5 | 6.2 | 6.3 |
| 22.0 | 3.3 | 3.4 |
| 46.0 | 1.9 | 1.4 |

EXAMPLE 8

Stability of Scavenging Capability

The reactivity towards oxygen of the photoreduced 2-methylanthraquinone in ethyl cellulose after 106 days storage in the absence of oxygen was demonstrated as follows. Ethyl cellulose, 1 g and 2-methylanthraquinone, 0.018 g, were dissolved in ethyl acetate, 9 ml, and cast as five films measuring approximately 10 cm×10 cm×200 μm on the surface of the co-extruded barrier film based on ethylene vinyl alcohol described in Example 3.

One of these coated films was made into a pouch and the air was removed and replaced by nitrogen. The film was irradiated as in Example 4 and the pouch was stored in an atmosphere of nitrogen for 106 days. The UV-visible spectrum was measured after which the pouch was opened to allow air to replace the nitrogen in the pouch. The spectrum was measured after one day and 3 weeks.

The spectra are shown in FIG. 3 which shows that the reduced species reoxidises with a decrease in absorbance at wavelengths above 350 nm and and increase around 330 nm characteristic of the reoxidation of the anthrahydroquinone or semiquinone species to the quinone form.

EXAMPLE 9

Photoreduction and reoxidation of 2-methylanthraquinone in the presence of poly(4-vinylpyridine)

A solution of 2-methylanthraquinone and ethyl cellulose in ethyl acetate was prepared and cast into 2 separate films as in Example 4. One of the films was coated over part of its area with a film of poly(4-vinylpyridine), PVP, made by casting a solution of 0.7 g of polymer from methanol solution followed by solvent evaporation.

The film samples were formed into pouches and irradiated using the techniques described in Example 4. After irradiation the pouches were opened and the excess co-extruded barrier packaging material was cut off. The samples were placed with the ethyl cellulose-coated side uppermost in plastic dishes where they were left in air for 4 days.

The samples were then covered with the starch/potassium iodide solution described in Example 4. The solution covering the sample not coated with PVP turned dark blue/black within a few minutes. The solution covering the PVP-coated area of the second sample did not become coloured even after several hours whereas the solution covering the uncoated areas coloured the same as was found with the uncoated sample.

The results indicate that the PVP scavenged the oxidizing species such as hydrogen peroxide formed in reoxidation of the photoreduced 2-methylanthraquinone.

EXAMPLE 10

Oxygen scavenging in the cold

A pouch was made from film comprising 2-methylanthraquinone, 0.055 g, with ethyl cellulose, 1.25 g and triphenylphosphine 0.118 g as described in Example 4. 20 ml of air was added and the pouch stored at −1.0 to 1.0° C.

Results

| Time (days) | % oxygen |
| --- | --- |
| 0.0 | 19.6 |
| 1. | 8.04 |
| 2. | 6.22 |
| 3. | 4.49 |
| 6. | 3.03 |
| 13. | 1.64 |
| 17. | 1.21 |
| 41. | 1.13 |

EXAMPLE 11

Dependence of scavenging upon irradiation time and delay between irradiation and exposure to air Ethyl cellulose, 1.2 g, and 2-methylanthraquinone, 0.118 g, were dissolved in ethyl acetate, 9 ml, and cast as four films onto the Surlyn side of CSDE film and made into pouches with the test film folded over onto itself and a half slice of tissue inserted between. All were vacuum packed in the Turbovac, then two were given a total of five minutes irradiation (half each side) and the other two ten minutes. One each of the pouches immediately had 20 ml of air injected, the other two being left overnight before they too had 20 ml of air introduced. This tested for whether leaving the films after reduction has any effect on their oxygen scavenging.

Results

| | Filled immediately | | Left overnight | |
| --- | --- | --- | --- | --- |
| Time (h) | 5M | 10M | 5M | 10M |
| 0.0 | 21. | 21. | 21. | 21. |
| 2. | 6.49 | 5.91 | | |
| 4.5 | | | 6.35 | 6.32 |
| 19.5 | 0.57 | 0.3 | | |
| 21.8 | | | 0.75 | 0.29 |
| 24. | 0.23 | 0.28 | | |
| 28.8 | | | 0.27 | |
| 50. | 0.2 | | | |

The results show that irradiation time may have some effect on rate of scavenging, but it is small between 5 and 10 minutes. Also, leaving the pouches prior to filling seems to have no effect.

EXAMPLE 12

Peroxide scavenging from a separate film

Films Cast

| MeAq (g) | NQ (g) | TPP (g) | EthCell (g) |
| --- | --- | --- | --- |
| 0.055 | — | — | 1.2 |
| — | 0.039 | — | 1.2 |
| — | — | 0.118 | 1.2 |

The 2-methylanthraquinone and 1,4-naphthoquinone (NQ) films were cast directly onto CSDE, with the triphenylphosphine (TPP) films cast onto polethylene cling wrap, then placed on top of the others, flattened out, and the edges taped down. Holes were punched through the TPP film so that it would not blow up when placed in the Turbovac. Bags were vacuum packaged and given 10 minutes irradiation before having 20 ml of air injected.

Results

| | % oxygen | |
| --- | --- | --- |
| Time (h) | MeAq | NQ |
| 0.0 | 21. | 21. |
| 2. | 14.45 | |
| 4.8 | | 17.75 |
| 18.8 | 5.03 | |
| 23.3 | | 12. |
| 25.8 | 4.47 | |
| 44.3 | 1.89 | |
| 89. | | 2.86 |
| 114.8 | 0.61 | |
| 166.3 | | 1.28 |
| 187.3 | 0.81 | |

EXAMPLE 13
Photoreduction on the coater-laminator

| Films cast | | |
|---|---|---|
| MeAq (g) | TPP (g) | EthCell (g) |
| 0.055 | 0.118 | 1.2 |
| — | 0.12 | 1.2 (onto polyethylene cling film) |
| 0.055 | — | 1.2 |

Pouches were set up in a similar way to previous examples, but irradiation was with a coater-laminator at a web speed of 5 m/min. The UV lamps cast a beam of light approximately 10 cm long, and thus the samples were irradiated for an average of 1.2 seconds. As in previous tests, 20 ml of air was injected.

| | Results | | | |
|---|---|---|---|---|
| | % oxygen | | | |
| Time (h) | Type a | Type b | Type c | Type d |
| 0.0 | 21. | 21. | 21. | 21. |
| 2. | | | 13.47 | 17.67 |
| 4.5 | | | 12.91 | 16.12 |
| 5.3 | 5.95 | 2.05 | | |
| 7. | 2.35 | 0.36 | 11.53 | 15.77 |
| 24. | 0.17 | | | |
| 77. | | | 2.18 | 10.89 |

(a) and (b)-MeAq and TPP in the one film.
(c) and (d)-TPP was in ethyl cellulose cast on polyethylene cling film.

The results appear to show that the scavenging performance is unaffected by the different method of photoreduction, and this was supported by the intense fluorescent colour of the film straight off the coater.

EXAMPLE 14
Stoichiometry of the MeAO reoxidation

| Films cast | | |
|---|---|---|
| MeAq (g) | TPP (g) | EthCell (g) |
| 0.055 | 0.118 | 1.2 |

Film was set up in a similar manner to previous examples, and irradiated for 10 minutes with the Xenon lamp before injecting 60 ml of air (ie, oxygen:MeAq ratio of 3:1).

| Results | |
|---|---|
| Time (h) | % oxygen |
| 0.0 | 21. |
| 89.5 | 9.52 |
| 115. | 9.36 |

This result indicates a scavenging ratio of 1.7 moles of oxygen scavenged per mole of MeAq. Extraction and HPLC/V-VIS revealed that no TPP was present (2:1 molar ratio with MeAq) and this may be confirmation that more than a 1:1 molar amount of peroxide was produced by the MeAq reoxidation.

EXAMPLE 15
Ferrous sulphate as a peroxide scavenger

| Films cast | | |
|---|---|---|
| MeAq (g) | F.Sul (g) | EthCell (g) |
| 0.055 | 0.344 | 1.2 |

Pouches were prepared in a similar manner to the previous examples with the ferrous sulphate heptahydrate F.Sul) (ground into fine powder) dispersed through it. The pouch vacuum packed, and irradiated for 10 minutes in the Xenon lamp, before 20 ml of air was injected.

| 0.0 | 21. |
|---|---|
| 2.3 | 16.27 |
| 18.8 | 7.42 |
| 25.5 | 5.46 |
| 114.8 | 2.53 |
| 142.8 | 2.07 |
| 190.8 | 1.6 |
| 260.8 | 3.17 |

The results suggest that oxygen scavenging is slower than when TPP is used

EXAMPLE 16
Anthraquinone-2-aldehyde (AQ2A): inbuilt peroxide scavenging

| Films cast | | |
|---|---|---|
| AQ2A (g) | TPP (g) | EthCell (g) |
| 0.058 | — | 1.2 |
| 0.058 | 0.118 | 1.2 |

Two films each were cast with the above quantities and vacuum packed before being irradiated for 10 minutes with the Xenon lamp and injected with 20 ml of air.

| Results | | | |
|---|---|---|---|
| Time (h) | AQ2A1 | Time (h) | +TPP1 |
| 0.0 | 21. | 0.0 | 21. |
| 2.3 | 17.02 | 2. | 8.61 |
| 19.3 | 15. | 4. | 5.33 |
| 44.8 | 14.52 | 75.5 | 0.62 |
| 121.5 | 12.44 | | |

EXAMPLE 17
PEF as peroxide scavenger

| Films cast | | |
|---|---|---|
| MeAq (g) | PEF (g) | EthCell (g) |
| 0.055 | 0.072 | 1.2 |

Two pouches were made, the bis(furfurylidene) pentaerythritol (PEF) being 1:1 w.r.t. MeAq, vacuum packed, irradiated for 10 minutes with the Xenon lamp, and injected with 20 ml of air.

| Results | | |
|---|---|---|
| Time (h) | MP1 | MP2 |
| 0.0 | 21. | 21. |
| 4. | 15.91 | 15.32 |
| 23.3 | 10.84 | 12.94 |
| 69. | 7.38 | 12.78 |
| 148.5 | 2.29 | 1.82 |

EXAMPLE 18

Cellulose acetate as scavenging medium

| Films cast | | |
|---|---|---|
| MeAq (g) | TPP (g) | Cel.Ac. (g) |
| 0.1 | 0.1 | 1.4 |

The pouches were prepared in a similar manner to previous examples and were irradiated with the Xenon lamp.

| Results | | |
|---|---|---|
| Time (h) | CA1 | CA2 |
| 0.0 | 21. | 21. |
| 5.3 | 19.2 | 8.57 |
| Time (h) | CA1 | CA2 |
| 23.5 | 1.3 | 1.05 |
| 30.3 | 5.14 | 0.38 |

EXAMPLE 19

LAMAL Adhesive—TPP peroxide scavenging

| Films cast | | | | |
|---|---|---|---|---|
| EtAq (g) | L-HSA (g) | L-C (g) | EtOH (g) | TPP (g) |
| 0.1 | 1.8 | 0.2 | 3. | 0.24 |

EtAq = 2-ethyl-9,10-anthraguinone
L-HSA = polyurethane base polymer
L-C = cross linking agent for the polyurethane Films were cast onto warm plate (covered with polyester/polyethylene laminate) using the TLC spreader with a gap of 300μ. The adhesive was then laminated with PVC clingwrap, and injected with 20 ml of air.

| Results | |
|---|---|
| Time (h) | Lamal 1 |
| 0.0 | 21. |
| 1.5 | 12.01 |
| 18.5 | 0.62 |
| 22.3 | 0.47 |

The results indicate that the films work well, although perhaps a little slower than TPP in ethyl cellulose.

EXAMPLE 20

LAMAL—Triisoproyl phosphite (TIP) peroxide scavenging

| Films cast | | | | |
|---|---|---|---|---|
| EtAq (g) | L-HSA (g) | L-C (g) | EtOH (g) | TIP (g) |
| 0.1 | 1.8 | 0.2 | 3. | 0.24 |

Two samples were prepared as in Example 19.

| Results | | |
|---|---|---|
| Time (h) | Lamal2 | Lamal3 |
| 0.0 | 21. | 21. |
| 3. | 13.86 | 17.42 |
| 21.5 | 9.63 | 7.23 |
| 45. | 4.19 | 5.36 |
| 189. | 3.61 | 4.26 |

EXAMPLE 21

Triisopropyl phosphite peroxide scavenging from ethyl cellulose

| Films Cast | | |
|---|---|---|
| EtAq (g) | TIP (g) | EthCel (g) |
| 0.1 | 0.1 | 1.2 |

Film was cast onto EVOH barrier material using the TLC spreader with a gap of approximately 400μ vacuum packed and irradiated as in previous examples.

| Results | | |
|---|---|---|
| Time (h) | TIP1 | TIP2 |
| 0.0 | 21. | 21. |
| 2.3 | 19.46 | 12.01 |
| 22.2 | 7.14 | 5.58 |
| 96.3 | 4.03 | 0.36 |
| 452. | 0.24 | 0.18 |

EXAMPLE 22

Use of gamma-irradiation for activation of ethyl cellulose films

A cobalt-60 source was used to provide a dose of 25 kilogray to films containing ethylanthraquinone and triphenylphosphite. The films were made as described below and the results provided in Table 5.

Ethylanthraquinone, 0.13 g, triphenylphosphite, 0.385 g, and ethyl cellulose, 3.3 g, were dissolved in ethyl acetate and the resulting solution was spread on two sheets of poly(ethylene-terephthalate); 12 μm thick with the aid of a doctor blade. The solvent was evaporated by warming to approximately 40° C. for 10 minutes in a fume hood. The resulting plastic films had an area of 18 cm×22 cm and was on average 100 μm thick.

The films prepared as above were placed in pairs in the bags and either smoothed manually before sealing or were sealed under vacuum followed by addition of a known volume of air or nitrogen. The bags were made either from metallised polyester laminated to polyethylene or were bag-in-box liners which contained an inner duplex liner of polyethylene as well as a sealed value socket. The area of each side of all bags was 18 cm×22 cm.

The volume of air initially in each bag was between 200 ml and 300 ml. It can be seen that the film consumed oxygen highly efficiently.

EXAMPLE 23

Use of gamma-irradiation for activation of ethylene vinyl acetate (EVA) films.

The irradiation treatments and the bags were the same as in Example 22. The EVA films were cast from toluene solutions containing the compositions shown below. The EVA was obtained as a gel (Morton Chemical Co., USA under the trade name Adcote 1133.

The Cetyl alcohol was used as the photoreducing agent supplying labile hydrogen or electrons, a function which appears to be served by the polymer itself in the case of the ethyl cellulose, cellulose acetate, and polyurethane adhesive (Lamal).

Cetyl alcohol, 0.32 g, triphenyl phosphite, 0.68 g, and 2-ethylanthraquinone, 0.4 g, were dissolved in the toluene gel of EVA, 12.5 g, to give a mobile solution. This was then cast into a film layer on the heat seal side of a 2 sheets of oxygen barrier plastic of ionomer/EVOH/polyester of oxygen transmission rate 1 $cm^3/m^2/24$ hr/atmosphere at 25° C., 75% RH. The area of film and thickness were as in Example 22.

The scavenging of oxygen present either prior to irradiation or injected into the bag after irradiation is shown in Table 6.

TABLE 5

| Bag | Oxygen % Initial | Final[1] | Activatable Component |
|---|---|---|---|
| PET/Pe | 20.6 | 9.0 | 2-EtAQ[2] |
| PET/Pe | 20.6 | 8.3 | 2-EtAQ |
| Bag-in-Box | 20.6 | 2.8 | 2-EtAQ |
| Bag-in-Box | 20.6 | 5.6 | 2-EtAQ |

[1]3 days after γ-irradiation
[2]2-ethylanthraquinone

TABLE 6

| Bag | Oxygen % Initial | Final[1] | Activatable Component |
|---|---|---|---|
| Bag-in-Box | 20.6[3] | 14.1 | 2-EtAQ[2] |
| Bag-in-Box | 20.6[3] | 10.8 | 2-EtAQ[2] |

[1,2]as per Table 5
[3]air injected 24 hours after irradiation.

EXAMPLE 24

Activation with Electron Beam

| | Films Cast | | | |
|---|---|---|---|---|
| Sample | EtAq(g) | TPP | TIP | EthCell(g) |
| A | 0.06 | 0.12 | | 1.2 |
| B | 0.06 | | 0.14 | 1.2 |

Pouches were prepared in a similar manner to previous examples. The total volume of the bags was measured, and this value was used to calculate the volume of oxygen (from air) initially present. Oxygen analysis was carried out 23 hours after the pouches were made, and the volume of oxygen scavenged calculated. This was then converted into the percentage of the stoichiometric amount scavenged (% Stoich.), which compares the actual volume of oxygen scavenged with the theoretical maximum which could be scavenged (assuming a 1:1 interaction of oxygen with anthraquinone).

| | Results | |
|---|---|---|
| Sample | Dose Rate (MRads) | % of Stoich |
| A | 3.0 | 68 |
| B | 1.1 | 32 |
| C | 3.0 | 80 |

The results show that the electron beam is an efficient method of inducing photoreduction and bringing about oxygen scavenging, even at lower dose rates.

EXAMPLE 25.

Oxygen scavenging from a tinplate can

A crosslinkable polyurethane resin was used to demonstrate the use of an oxygen-scavenging coating on the inside of a tinplate can.

A can of volume 465 ml was coated internally with a solution of Lamal HSA, 3.64 g, and Larmal C, 0.54 g, 2-ethylanthraquinone, 0.33 g, and triphenylphosphite, 0.33 g, in ethanol 6 g. The solvents were evaporated at 50–60° C. leaving a coating of polyurethane resin containing 2-ethylanthraquinone and triphenylphosphite on the inside of the can. The can was then exposed to irradiation in the solar simulator for five minutes and then filled loosely with glass beads to reduce the headspace to 170 ml and the can was then sealed by double-seaming.

The headspace gas was anaylsed after 24 hours by which time the oxygen concentration had been reduced from 20.6% to 19.5%. The oxygen consumed was 2.5 ml. This represents the quantity of oxygen which can be found sometimes in commercial cans.

EXAMPLE 26

Oxygen Scavenging with a Copolymerised Reducible Organic Compound

Copolymers of 2-vinylanthraquinone were made with styrene (STY) and with 2-hydroxyethyl methacrylate (HEMA). The copolymers contained approximately 9 moles % of polymerised anthraquinonoid monomer.

Films were cast on the Polyester/EVOH/Surlyn barrier film as described in other examples using the quantities shown below. The HEMA copolymer and its blend from ethyl cellulose were cast from ethanol and the styrene copolymer was cast from a mixture of chloroform (70%) and acetone (30%). The films were made into pouches and the air was removed as in other examples. The pouches were irradiated for 5 minutes on each side in the Suntester solar simulator and 20 ml of air was injected into each pouch, except for that containing the blend which was injected with 50 ml of a mixture of 2.1% oxygen in nitrogen.

| Test | Quantities of Ingredients (g) | | | | |
|---|---|---|---|---|---|
| | HEMA Copolymer | STY Copolymer | $C_6H_5O)_3P$ | Cetyl Alcohol | Ethyl Cellulose |
| A | 0.6 | — | 0.11 | — | — |
| B | 0.25 | — | 0.10 | — | 1.0 |
| C | — | 0.5 | 0.11 | 0.09 | — |

Results

| Time (h) | % Oxygen | | |
|---|---|---|---|
| | Test A | Test B | Test C |
| 0 | 21.0 | 2.1 | 21.0 |
| 17.0 | — | 1.2 | — |
| 64.7 | 15.4 | — | 16.0 |

The results show that the polymers scavenge oxygen, but their permeability to oxygen can result in slower scavenging than with a highly permeable film such as ethyl cellulose.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A method of lowering the concentration of ground state molecular oxygen present in an atmosphere or liquid, said method comprising the steps of:

(i) irradiating a solid phase composition comprising a source of labile hydrogen or electrons and at least one organic polymer, copolymer or oligomer bearing a reducible substituent(s) selected from the group consisting of substituted or unsubstituted benzoquinone, 9,10-anthraquinone, and 1,4-naphthoquinone, with visible or ultraviolet light of a predetermined intensity or wavelength, γ-rays, corona discharge or an electron beam so as to reduce the reducible substituent(s) to a stable reduced substituent(s) oxidizable by ground state molecular oxygen; and (ii) exposing the atmosphere or liquid in substantial darkness to said irradiated solid phase composition such that the amount of ground state molecular oxygen present in the atmosphere or liquid is lowered through oxidation of the reduced stable substituent(s);

wherein the oxidation of the reduced stable form of the reducible substituent(s) occurs regardless of the presence of a transition metal catalyst and wherein the lowering of the amount of ground state molecular oxygen continues over a period of at least 1 hour when conducted at room temperature.

2. A method according to claim 1, wherein the lowering of the amount of ground state molecular oxygen continues over a period of at least 4 hours when conducted at room temperature.

3. A method according to claim 1, wherein the source of labile hydrogen or electrons is provided by the said polymer, copolymer or oligomer.

4. A method according to claim 1, wherein the source of labile hydrogen or electrons is provided by another polymer, copolymer or oligomer.

5. A method according to claim 1, wherein the solid phase composition is a polymeric film or polymeric film layer.

6. A method according to claim 1, wherein the solid phase composition further comprises a scavenging component reactive towards activated oxygen species resulting from the said oxidation of the reduced stable form of the reducible substituent(s).

7. A method according to claim 6, wherein the scavenging component is a substituent(s) present on the said polymer, copolymer or oligomer.

8. A method according to claim 6, wherein the scavenge component is a substituent(s) present on another polymer, copolymer or oligomer.

* * * * *